(12) United States Patent
Brazas

(10) Patent No.: US 6,837,716 B1
(45) Date of Patent: Jan. 4, 2005

(54) PUSH-IN BALL SOCKET

(75) Inventor: Peter B. Brazas, Burbank, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/612,024

(22) Filed: Jul. 2, 2003

(51) Int. Cl.[7] .............................................. H01R 39/00
(52) U.S. Cl. ............................................ 439/8; 403/122
(58) Field of Search ...................... 439/6–8; 403/2, 403/7, 115, 122, 135, 348; 362/514, 515, 528

(56) References Cited

U.S. PATENT DOCUMENTS

| | | | |
|---|---|---|---|
| 5,483,426 A | 1/1996 | Lewis et al. ................. 362/66 |
| 5,653,548 A | * 8/1997 | Amdahl ....................... 403/133 |
| 6,113,301 A | 9/2000 | Burton ........................ 403/122 |
| 6,244,735 B1 | * 6/2001 | Burton ........................ 362/528 |

* cited by examiner

*Primary Examiner*—Alex Gilman
(74) *Attorney, Agent, or Firm*—Mark W. Croll; Paul F. Donovan

(57) ABSTRACT

A ball socket suitable for a headlamp adjustment assembly. The ball socket has a ring, a plurality of arches and outwardly directed tabs aligned with the arches. Panels between the arches each have outwardly directed ledges. Inwardly directed fingers are provided between the arches substantially aligned with the ledges.

18 Claims, 3 Drawing Sheets

PUSH-IN BALL SOCKET

FIELD OF THE INVENTION

The present invention relates to push-in sockets and, more particularly, the invention relates to push-in sockets of the type used as anchors for adjuster mechanisms useful for adjusting the aim of motor vehicle headlamps.

BACKGROUND OF THE INVENTION

Headlamps on motor vehicles require proper aiming, both vertically and horizontally, for safe and optimal performance. From time-to-time, it is necessary to readjust the aim of vehicle headlamps. If the headlamp is not properly adjusted vertically, the headlamp may focus the light too close to the vehicle, not adequately lighting the distance. If the field of light is too short, objects might not be illuminated soon enough for a driver to react to the presence of the object, even if the vehicle is being operated within legal speed limits. Conversely, if the headlamp is aimed to focus too far in the distance, the area in front of the vehicle may not be properly illuminated for adequate recognition of something in front of the vehicle. Further, a headlamp aimed too distant may "blind" an oncoming driver even in the dimmed or "low-beam" condition.

Proper horizontal adjustment is just as important as proper vertical adjustment. If the headlamp is aimed to direct the beam of light too far to the left, oncoming drivers can be blinded. If focused too far left to the right, the primary field directly in front of the automobile may not be properly illuminated. Improperly directed headlamps can be distracting and unsafe.

Many different adjustment assemblies have been used for automobile headlamps; some used more successfully than others. In one known type, a ball stud of an adjustment mechanism is snap fit into a ball socket secured to an associated member in the headlamp assembly. Retainers of this type have ledge members that distort to allow the ball socket to be inserted into a hole of the panel, and spring back against the backside of the panel to prevent the socket from being pulled out. Tab members prevent the socket from being pushed through the panel. Finger members deflect to allow the ball from the stud to be pushed into the socket. The tab members are positioned on quadrants opposite basket members of the socket, and the ledge members are on the same quadrants as the basket members, opposite the fingers.

Insertion force required to push the socket into the panel is high, and often moisturizing is used to facilitate insertion. This requires that the socket be made of hydroscopic material, such as certain types of nylon.

To assemble the system, the ball socket is moisturized and pushed into a hole in the panel. The edge of the panel defining the hole is held between the tab members on one side of the panel and the ledge members on and opposite side of the panel, with the tab members and ledge members on different, but adjacent quadrants. Thereafter, the ball of the stud is pushed into the basket of the socket, deflecting the fingers. The ball socket is designed for five removals and re-insertions of the ball stud for servicing, while still retaining a specified pull-out resistance.

While commonly known ball studs have 10 mm diameter balls, the trend is to use smaller ball studs with, perhaps, 8 mm diameter balls. Many 8 mm ball systems employ a costly undercut on the steel ball stud where the ball portion meets the shaft portion. This feature is used in conjunction with features in the ball socket to increase the pullout force necessary to remove the ball from the socket.

What is needed in the art is an improved ball socket that can be inserted into a panel more easily without moisturizing the socket. What is also needed is an improved ball socket that holds the ball more securely without the need for an undercut on the ball stud.

SUMMARY OF THE INVENTION

The present invention provides a ball socket in which the tab members are on the same quadrant as the basket members, for easier insertion of the retainer into a panel without moisturizing, and more robust retention of smaller balls in the socket.

In one aspect thereof, the present invention provides an automobile headlamp adjustment assembly with an anchor panel defining a hole and a ball socket disposed in the hole and secured to the anchor panel. The socket includes a ring and a plurality of arches spanning the ring on one side thereof to generally define a basket having an opening thereto through the ring. Socket panels are joined to the ring between the arches. Each socket panel has an outwardly directed ledge engaging the anchor panel. Inwardly directed fingers are substantially aligned with the ledges between the arches. A ball stud has a shaft and a ball at an end of the shaft. The ball is disposed in the basket and secured therein by the fingers.

In another aspect thereof, the present invention provides a ball socket, with a ring and a plurality of arches spanning the ring on one side thereof to generally define a basket having an opening thereto through the ring. Outwardly directed tabs are substantially aligned with the arches. Socket panels are joined to the ring between and spaced from the arches. Each the socket panel has an outwardly directed ledge. Inwardly directed fingers are substantially aligned with the ledges between the arches.

In still another form thereof, the present invention provides a ball socket with a basket having an opening thereto, outwardly directed tabs on the basket and socket panels joined to the basket along one edge. Each socket panel has an outwardly directed ledge. Inwardly directed fingers are substantially aligned with the ledges.

An advantage of the present invention is providing a ball socket that is inserted easily into a panel and does not require moisturizing of the prior to insertion.

Another advantage of the present invention is providing a ball socket that can be made of plastic or other non-corrosive materials, both hydroscopic and hydrophobic.

Still another advantage of the present invention is providing a ball socket that holds small balls securely.

Other features and advantages of the invention will become apparent to those skilled in the art upon review of the following detailed description, claims and drawings in which like numerals are used to designate like features.

Figure 1:
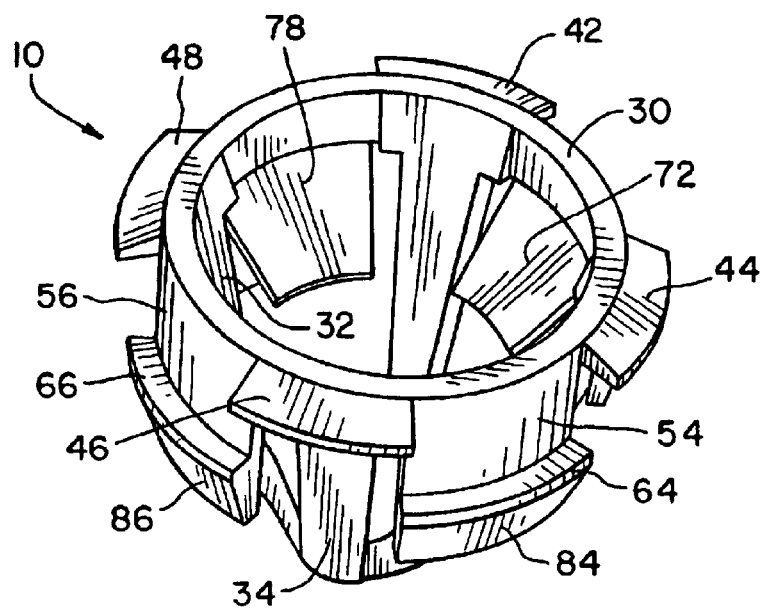
FIG. 1 is a perspective view of a ball socket in accordance with the present invention.
Figure 2:
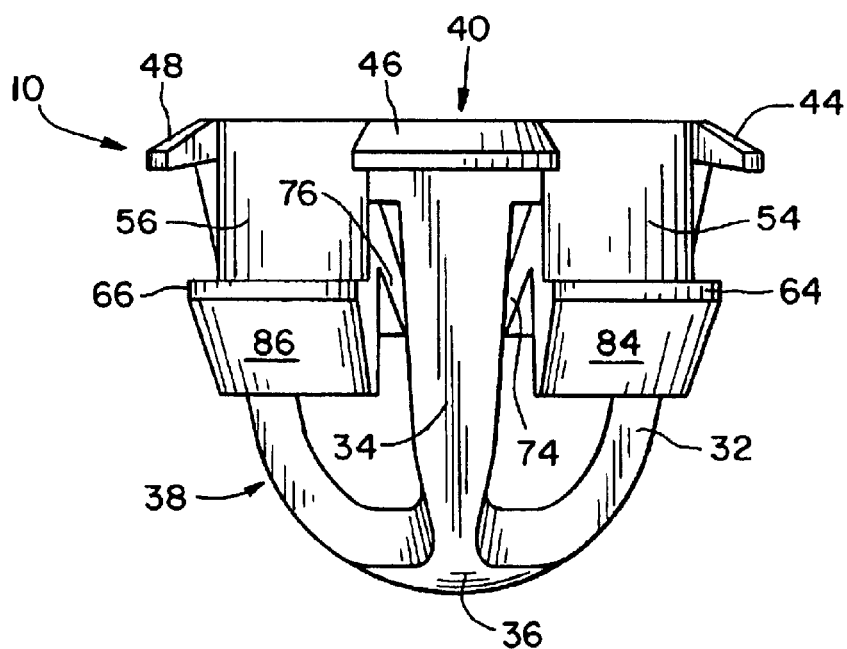
FIG. 2 is an elevational view of the ball socket shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Figure 3:
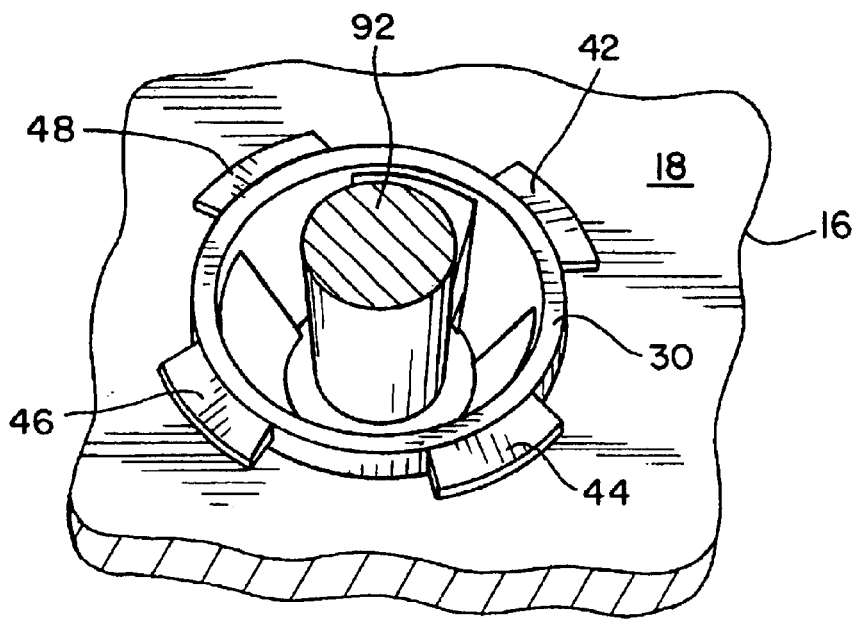
FIG. 3 is a perspective view the ball socket shown in a fragment of a panel, and having a ball stud shown in cross-section inserted in the socket.
Figure 4:
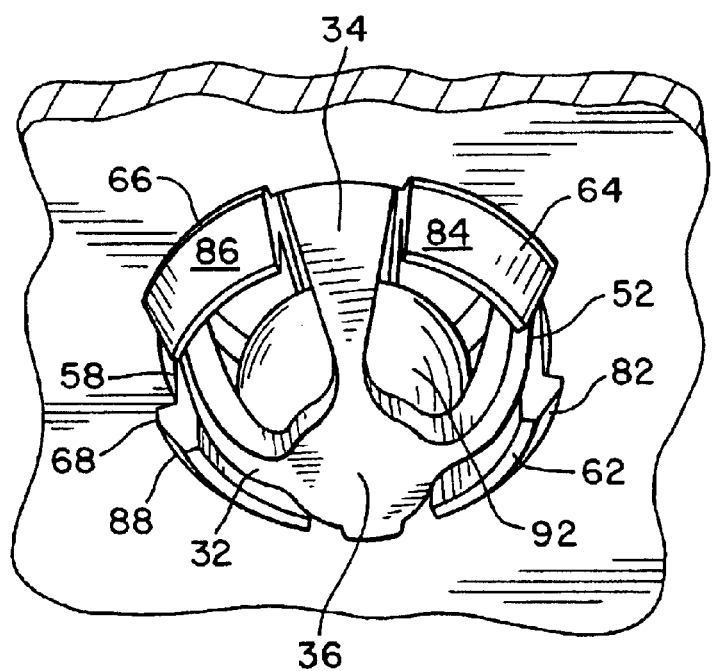
FIG. 4 is a perspective view of the ball socket, panel fragment and ball stud shown in FIG. 3, the view being shown from the opposite side of the panel from that shown in FIG. 3.
Figure 5:
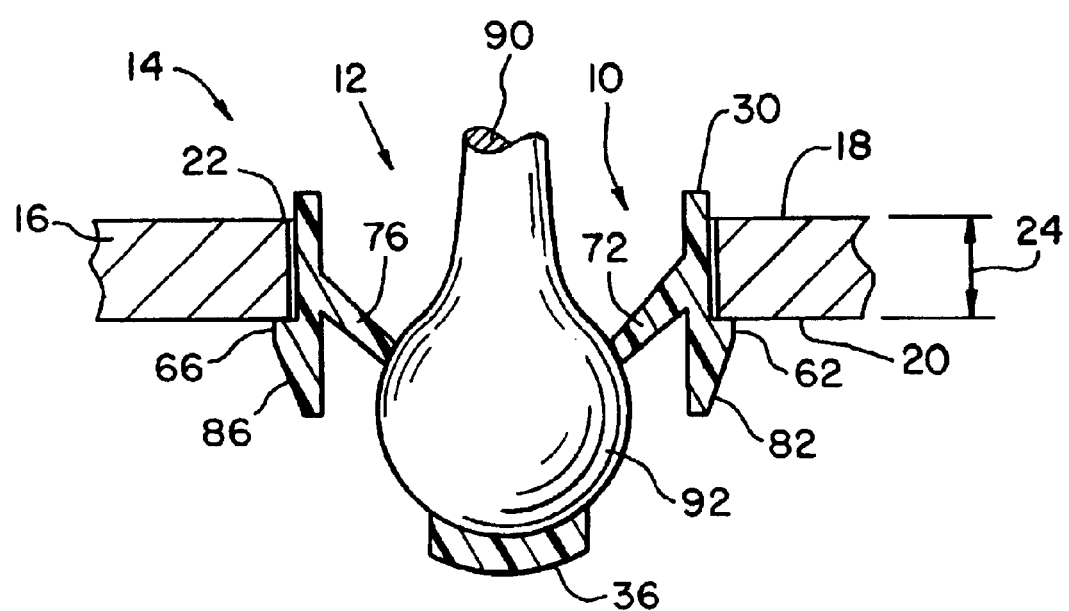
FIG. 5 is a cross-sectional view of the assembly shown in FIGS. 3 and 4.

Referring now and more specifically to the drawings and to FIG. 1 in particular, numeral 10 designates a ball socket in accordance with the present invention. Ball socket 10 is used to secure a generally spherical body therein, and has particular applicability and suitability for holding a ball stud 12 (FIGS. 3–5) of an adjustment mechanism for a motor vehicle headlamp adjustment assembly 14. However, it should be understood that ball socket 10 of the present invention can be used for other mechanisms and assemblies as well.

Advantageously, ball socket 10 is made of molded plastic, or of other non-corrosive materials. Unlike ball sockets used previously, which because of the rigid structural design used, required moisturizing during assembly, ball socket 10 does not require moisturizing during assembly of adjustment assembly 14. Therefore, the material used for ball socket 10 can be selected for other desirable characteristics, without regard to whether the material is hydroscopic, and both hydroscopic and hydrophobic materials can be used.

Ball socket 10 is mounted in an anchor panel 16, as will be described subsequently herein. Ball socket 10 secures relative axial positioning of an end of ball stud 12 relative to panel 16, while also allowing some degree of rotation of ball stud 12 during operation of headlamp adjustment assembly 14. Anchor panel 16 has a first side 18 and a second side 20, and defines a hole 22 therethrough for receiving ball socket 10. In the region thereof immediately adjacent hole 22, anchor panel 16 has a thickness indicated by numeral 24.

Ball socket 10 includes an outer ring 30 and a plurality of arches 32, 34 connected to and preferably integrally with ring 30. Two arches 32, 34 are shown spanning ring 30, generally dividing ball socket 10 into equal quadrants. Arches 32, 34 extend away from ring 30 and angle generally inwardly joining each other at an apex plate 36. Together, arches 32 and 34 and apex plate 36 generally define a basket 38 for receiving ball stud 12. An opening 40 to basket 38 is defined through ring 30.

In the vicinity of each end of arches 32 and 34, a tab 42, 44, 46, or 48 is provided. Tabs 42, 44, 46 and 48 are outwardly extending projections generally aligned with arches 32, 34 and near the outer edge of ring 30. Tabs 42, 44, 46 and 48 are configured to engage first side 18 of panel 16, and extend outwardly from ring 30 to define a diameter wider than the diameter of hole 22. Tabs 42, 44, 46 and 48 ensure that ball socket 10 is not pushed entirely through hole 22 during assembly of headlamp assembly 14.

Socket panels 52, 54, 56 and 58 are provided between arches 32 and 34, one socket panel 52, 54, 56 or 58 being in each of the quadrants defined by and between arches 32, 34. Socket panels 52, 54, 56 and 58 are connected to, and preferably integrally formed with ring 30 and depend away from ring 30 on the same side thereof as basket 38. Socket panels 52, 54, 56 and 58 are in spaced relation to arches 32 and 34, and are connected only along segments of ring 30. Each socket panel 52, 54, 56 and 58 includes an outwardly directed ledge 62, 64, 66, 68, respectively. Ledges 62, 64 and 66, 68 are configured to engage second side 20 of panel 16, and in a relaxed or non-deflected state extend outwardly from socket panels 52, 54, 56 and 58 to define a diameter wider than the diameter of hole 2238.

In each quadrant defined by and between arches 32 and 34 at least one inwardly directed finger 72, 74, 76 or 78 is provided in basket 38, substantially aligned with ledges 62, 64, 66 and 68. Fingers 72, 74, 76, 78 project inwardly and downwardly in basket 38, toward apex plate 36.

To assist in the insertion of ball socket 10 into hole 22, ledges 62, 64, 66, 68 each include a relatively smooth outer surface 82, 84, 86, 88, respectively, that slopes inwardly in a direction away from ring 30.

Ball stud 12 can be made of metal or plastic and includes a shaft 90 with a ball 92 on an end thereof. Ball 92 is of a size to be received in basket 38 and to be held therein by fingers 72, 74, 76 and 78.

In a generally linear direction along arches 32 and 34, tabs 42, 44, 46 and 48 are spaced from ledges 62, 64, 66 and 68 on adjacent socket panels 52, 54, 56 and 58 by a distance substantially equal to the thickness of panel 16 indicated by numeral 24.

To assembly a headlamp adjustment assembly 14 ball socket 10 is aligned with the hole 22 in anchor panel 16 such that apex plate 36 of basket 38 first enters hole 22 from first side 18. As ball socket 10 is pushed into hole 22, outer surfaces 82, 84, 86 and 88 of socket panels 52, 54, 56, 58, respectively, engage the edge defining hole 22. Since socket panels 52, 54, 56 and 58 depend away from ring 30 and are unattached otherwise in basket 38, each can deflect inwardly as outer surfaces 82, 84, 86, 88 are forced through hole 22. If outer surfaces 82, 84, 86, 88 are made relatively smooth, each slides easily along the edge of material in anchor panel 16 defining hole 22. Thus, the force required to insert ball socket 10 into panel 16 is reduced as compared to the more rigid ball socket structures used previously, and moisturizing ball socket 10 is not required for assembly.

Ball socket 10 is forced into hole 22 until tabs 42, 44, 46 and 48 engage first side 18 of anchor panel 16. At this point of assembly, ledges 62, 64, 66 and 68 will have cleared hole 22 and side 20, and socket panels 52, 54, 56 and 58 spring outwardly to engage hole 22 while ledges 62, 64, 66 and 68 engage second side 20 of anchor panel 16. Ball socket 10 is thereby held securely within hole 22 with marginal portions of panel 16 adjacent hole 22 secured between tabs 42, 44, 46, 48 and ledges 62, 64, 66, 68. Ball socket 10 can not easily be pushed further into or pulled outwardly from hole 22.

Ball 92 of ball stud 12 is placed into basket 38 and against inwardly projecting fingers 72, 74, 76 and 78. Inward pressure on ball stud 12 causes outward deflection of fingers 72, 74, 76, 78 so that ball 92 of ball stud 12 can be forced further inward until it rests against apex plate 36. A distance between the inner surface of apex plate 36 and the distal edge of each of fingers 72, 74, 76 and 78 is selected with respect to the radius of ball 92 such that fingers 72, 74, 76 and 78 spring inwardly as ball 92 is fully inserted into basket 38. Ball 92 is thereby held securely within basket 38 between apex panel 36 and fingers 72, 74, 76 and 78.

The present invention provides a ball socket more easily inserted than ball socket used previously, and yet which receives and holds a ball stud securely.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A motor vehicle headlamp adjustment assembly, comprising:
    an anchor panel defining a hole;
    a ball socket disposed in said hole and secured to said anchor panel, said socket including:
        a ring;
        a plurality of arches spanning said ring on one side thereof to generally define a basket having an opening thereto through said ring;
        a plurality of socket panels joined to said ring between and in spaced apart relation to said arches, each said socket panel having an outwardly directed ledge engaging said anchor panel; and
        inwardly directed fingers substantially aligned with said ledges between said arches; and
    a ball stud having a shaft and a ball at an end of said shaft, said ball disposed in said basket and secured therein by said fingers and tabs outwardly extended from said ring and substantially aligned with said arches, said tabs engaging said anchor panel.

2. The adjustment assembly of claim 1, said anchor panel having a thickness adjacent said hole, and said ledges and said tabs spaced from each other in a direction along said arches by a distance substantially the same as said anchor panel thickness.

3. The adjustment assembly of claim 1, said ball socket made of plastic.

4. The adjustment assembly of claim 1, including four said socket panels.

5. The adjustment assembly of claim 2, said anchor panel having a thickness adjacent said hole, and said ledges and said tabs spaced from each other in a direction along said arches by a distance substantially the same as said anchor panel thickness.

6. The adjustment assembly of claim 1, said basket angling inwardly from said ring for insertion through said hole in said panel.

7. The adjustment assembly of claim 6, said panel having a first side and a second side, said ring disposed substantially on said first side of said anchor panel, and said ledges engaging said second side of said anchor panel.

8. The adjustment assembly of claim 7, including outwardly directed tabs substantially aligned with said arches, said tabs engaging said first side of said panel.

9. The adjustment assembly of claim 7, said ledges having outer surfaces slopped inwardly in a direction away from said ring.

10. The adjustment assembly of claim 7, including four said socket panels.

11. A ball socket, comprising:
    a ring;
    a plurality of arches spanning said ring on one side thereof to generally define a basket having an opening thereto through said ring;
    outwardly directed tabs substantially aligned with said arches;
    a plurality of socket panels joined to said ring between and spaced apart from said arches, each said socket panel having an outwardly directed ledge; and
    inwardly directed fingers substantially aligned with said ledges between said arches said tabs and ledges being spaced radially and linearly.

12. The ball socket of claim 11, including four said socket panels.

13. The ball socket of claim 11, said ledges having outer surfaces slopped inwardly in a direction away from said ring.

14. The ball socket of claim 11 made of plastic.

15. The ball socket of claim 11, said basket angling inwardly.

16. The ball socket of claim 15, including four said socket panels.

17. The ball socket of claim 16 including four said socket panels.

18. A ball socket, comprising:
    a basket having arches forming an opening thereto;
    outwardly directed tabs on the basket;
    socket panels joined to the basket along one edge, each said socket panel having an outwardly directed ledge, said tabs being aligned with arches and arranged in non-alignment relation with adjacent ledges radially and linearly; and
    inwardly directed fingers substantially aligned with said ledges.

* * * * *